(12) United States Patent
Kulkarni et al.

(10) Patent No.: US 7,313,550 B2
(45) Date of Patent: Dec. 25, 2007

(54) PERFORMANCE OF ARTIFICIAL NEURAL NETWORK MODELS IN THE PRESENCE OF INSTRUMENTAL NOISE AND MEASUREMENT ERRORS

(75) Inventors: Bhaskar Dattatray Kulkarni, Pune (IN); Sanjeev Shrikrishna Tambe, Pune (IN); Jayaram Budhaji Lonari, Pune (IN); Neelamkumar Valecha, Mumbai (IN); Sanjay Vasantrao Dheshmukh, Mumbai (IN); Bhavanishankar Shenoy, Mumbai (IN); Sivaraman Ravichandran, Mumbai (IN)

(73) Assignee: Council of Scientific & Industrial Research, New Delhi (IN)

( * ) Notice: Subject to any disclaimer, the term of this patent is extended or adjusted under 35 U.S.C. 154(b) by 622 days.

(21) Appl. No.: 10/112,069

(22) Filed: Mar. 27, 2002

(65) Prior Publication Data

US 2003/0191728 A1    Oct. 9, 2003

(51) Int. Cl.
*G06E 1/00* (2006.01)
(52) U.S. Cl. .......................... 706/21; 706/13
(58) Field of Classification Search .............. 706/21, 706/13
See application file for complete search history.

(56) References Cited

U.S. PATENT DOCUMENTS

| | | | | |
|---|---|---|---|---|
| 4,912,651 A | * | 3/1990 | Wood et al. | 706/25 |
| 5,140,530 A | * | 8/1992 | Guha et al. | 706/13 |
| 5,265,192 A | * | 11/1993 | McCormack | 706/20 |
| 6,353,816 B1 | * | 3/2002 | Tsukimoto | 706/17 |
| 6,449,603 B1 | * | 9/2002 | Hunter | 706/15 |
| 6,678,669 B2 | * | 1/2004 | Lapointe et al. | 706/15 |

OTHER PUBLICATIONS

"Learning Neural Networks with noisy inputs using the errors-in-variables approach", Van Gorp J., Schoukens J., Pintelon R., Neural Networks, IEEE Transactions on, Mar. 2000, vol. 11, issue 2, pp. 402-414.*

(Continued)

*Primary Examiner*—Wilbert Starks
*Assistant Examiner*—Mai T. Tran
(74) *Attorney, Agent, or Firm*—Sughrue Mion, Pllc.

(57) ABSTRACT

A method is described for improving the prediction accuracy and generalization performance of artificial neural network models in presence of input-output example data containing instrumental noise and/or measurement errors, the presence of noise and/or errors in the input-output example data used for training the network models create difficulties in learning accurately the nonlinear relationships existing between the inputs and the outputs, to effectively learn the noisy relationships, the methodology envisages creation of a large-sized noise-superimposed sample input-output dataset using computer simulations, here, a specific amount of Gaussian noise is added to each input/output variable in the example set and the enlarged sample data set created thereby is used as the training set for constructing the artificial neural network model, the amount of noise to be added is specific to an input/output variable and its optimal value is determined using a stochastic search and optimization technique, namely, genetic algorithms, the network trained on the noise-superimposed enlarged training set shows significant improvements in its prediction accuracy and generalization performance, the invented methodology is illustrated by its successful application to the example data comprising instrumental errors and/or measurement noise from an industrial polymerization reactor and a continuous stirred tank reactor (CSTR).

8 Claims, 2 Drawing Sheets

OTHER PUBLICATIONS

"Creating Artificial Neural Networks that generalize", Jocelyn Sietsma & Robert J. F. Dow, Neural Networks (USA), vol. 4, No. 1, pp. 67-79, (1991).*

"Noise Injection into Inputs in Back-Propagation Learning", Kiyotoshi Matsuoka, Systems, Man and Cybernetics, IEEE Transactions on, May-Jun. 1992, vol. 22, Issue 3, pp. 436-440.*

"A Global Gradient-Noise Covariance Expression for Stationary Real Gaussian Inputs", P. Edgar An, Martin Brown, and C. J. Harris, Neural Networks, IEEE Transactions on, vol. 6, Issue 6, Nov. 1995 pp. 1549-1551.*

"Global Optimisation by Evolutionary Algorithms", Xin Yao, Parallel Algorithms/Architecture Synthesis, 1997. Proceedings. Second Aizu International Mar. 17-21, 1997, pp. 282-291.*

The effects of adding noise during backpropagation training on a generalization performance, Guozhong An, Neural Computation (USA), vol. 8, No. 3, pp. 643-674, Apr. 1, 1996.*

"Artificial neural network feedforward/feedback control of a batch polymerization reactor", Shahrokhi, N.; Pishvaie, M.R.; American Control Conference, 1998. Proceedings of the 1998, vol. 6, Jun. 24-26, 1998 pp. 3391-3395.*

"On-line re-optimisation control of a batch polymerisation reactor based on a hybrid recurrent neural network model",Yuan Tian; Jie Zhang; Morris, J.; American Control Conference, 2001. Proceedings of the 2001, vol. 1, Jun. 25-27, 2001 pp. 350-355.*

Poggio, T., et al., "Regularization Algorithms for Learning that are Equivalent to Multilayer Networks," Science, vol. 247, pp. 978-982 (1990).

Rumelhart, D.E., et al., "Learning Representations by Back-Propagating Errors," Nature, vol. 323, pp. 533-536 (Oct. 1986).

Van Gorp, J., et al., "The Errors-in-Variables Cost Function for Learning Neural Networks with Noisy Inputs," Intelligent Engineering Systems Through Artificial Neural Networks, vol. 8, pp. 141-146 (1998).

Bishop, C.M., "Training with Noise is Equivalent to Tikhonov Regularization," Neural Computation, vol. 7, pp. 108-116 (1995).

Goldberg, D.E., "A Gentle Introduction to Genetic Algorithms," Genetic Algorithms in Search, Optimization, and Machine Learning; Addison-Wesley, New York, 1989, Holland, J. Adaptation in Natural and Artificial Systems, University of Michigan Press, Ann Arbor, MI, USA (pp. 1-7).

Tambe, S.S., Kulkarni, B.D., Deshpande, P.B., Elements of Artificial Neural Networks with Selected Applications in Chemical Engineering, and Chemical & Biological Sciences, Simulation & Advanced Controls, Inc: Louisville, USA, 1996 (pp. 19-23).

* cited by examiner

PERFORMANCE OF ARTIFICIAL NEURAL NETWORK MODELS IN THE PRESENCE OF INSTRUMENTAL NOISE AND MEASUREMENT ERRORS

FIELD OF INVENTION

The present invention relates to a method for improving prediction accuracy and generalization performance of artificial neural network models in presence of input-output data containing instrumental noise and/or measurement errors.

BACKGROUND AND PRIOR ART REFERENCES

Artificial neural networks (ANNs) are suitable for modeling complex multiple input-multiple output nonlinear processes owing to their ability of approximating nonlinear relationships to an arbitrary degree of accuracy (Poggio, T. and Girosi, F. Regularization algorithms for learning that are equivalent to multilayer networks. *Science*, 247, 978, 1990). As a result, ANNs have been extensively used in industries for making on-line and off-line predictions of process variables. The industrial applications of ANNs include process identification, steady-state and dynamic process modeling, fault detection and diagnosis, soft-sensor development, and nonlinear process control and monitoring. These ANN applications have been comprehensively reviewed by Tambe and co-authors (Tambe, S. S., Kulkarni, B. D., Deshpande, P. B. *Elements of Artificial Neural Networks with Selected Applications in Chemical Engineering, and Chemical & Biological Sciences*, Simulation & Advanced Controls Inc.: Louisville, USA, 1996). During any process operation, huge amounts of process input-output data are generated, which can be used to develop ANN models that can predict in advance the values of process output variables. The desirable characteristics of an ANN model are: (i) it should accurately predict the outputs contained in the input-output example dataset used for its construction, and (ii) it possesses good generalization capability. Conventionally, ANN models are trained using a suitable weight-adjustment algorithm that minimizes a pre-specified cost (error) function. It may be noted that the form of the cost function completely determines the stochastic properties (noise sensitivity) of the resulting ANN model. For instance, most widely used error-back-propagation (EBP) (Rumelhart, D., Hinton, G., Williams, R., Learning representations by backpropagating errors. *Nature*, 323,533,1986) algorithm performs minimization of the root-mean-squared-error (RMSE) function. In any large set of process data, presence of instrumental noise and/or measurement errors is imminent. The presence of noise and/or errors in the input-output data used for network training creates a threshold limit for the accuracy of model predictions and the generalization performance exhibited by the model. This happens mainly because the network tries to approximate (learn) the average relationship existing between the input and the output data containing noise and/or errors. Since the network ignores the noise and errors in the data, the average relationship captured by it is fraught with inaccuracies. The inaccuracies in the prediction, if they are significant, cannot be tolerated since a significant number of control and policy decisions regarding the process operation are based on the predictions made by the model. For example, in polymerisation reactors, prediction of quality variables, such as melt flow index (MFI), stress exponent ($S_{ex}$), etc., are important in deciding the grade of the polymer produced. An ANN model capable of generalization not only accurately predicts the outputs in the data (example set) used for its development, but also those corresponding to a new or novel input data. Thus, it is critically important that an ANN model possesses not only excellent prediction accuracy, but also a good generalization property.

It has been observed by Gorp and coworkers (Gorp, J. V., Schoukens, J., Pintelon, R., Learning neural networks with noisy inputs using the errors-in-variables approach, *Transactions on Neural Networks A*. 180, 1–14, 1999) that in commercial software, most of the ANN models are trained using a simple output error (OE) cost function and this can lead to severe biased errors in the network predicted output when input data are noisy. The authors show that presence of noise actually suppresses the higher order derivatives of ANN model's transfer function and a bias is introduced if the conventional least-squares cost functions are employed. Accordingly, a method for improving ANN's generalization performance recommends replacement of the RMSE cost function with a novel cost function, for instance, the Errors-In-Variables (EIV) cost function (Gorp, J. V., Schoukens, J., Pintelon, R., Learning neural networks with noisy inputs using the errors-in-variables approach, *Transactions on Neural Networks A*. 180, 1–14, 1999). The drawback of the EIV method is that its implementation requires the knowledge of variances pertaining to the inputs and outputs. In many practical settings, this information is not available, thus severely limiting the utility of the EIV method. The methodology, though works better for the noisy measurements, it also requires large memory and can be caught into a local minimum. Alternative methodologies, such as: (i) using EIV method as a post-processing tool after application the OE method, (ii) usage of the measured input and output values instead of the estimated values, and (iii) modified learning and optimization schemes, are variedly proposed and illustrated (Gorp, J. V., Schoukens, J., Pintelon, R., The errors in variables cost function for learning neural networks with noisy inputs, *Intelligent Engineering Systems Through Artificial Neural Networks*, 8, 141–146, 1998).

Literature reporting the effects of addition of noise on the performance of an ANN model is relatively scarce and only a few systematic studies have been conducted so far. It is generally known that addition of noise to the training data helps in obtaining a model possessing better generalization performance. Sietsma and Dow reported (Sietsma, J., Dow, R., J., Creating artificial neural networks that generalize, *Neural Networks* 4, 67–79, 1991) the beneficial effects of noise and added pseudo-Gaussian-distributed noise to each element of the training pattern (vector). They showed that training with noise-added data improves the classification ability of the multilayer perceptron (MLP) networks. The study also revealed that higher number of network nodes are now required and each node contributes independently to the solution; it is also possible that a few units, which do not contribute significantly to the network output, can be removed via a suitable network pruning technique. This viewpoint is also shared by Minai and Williams (Minai, A.

A., Williams, R. D., Perturbation response in feedforward networks, *Neural Networks*, 7(5), 783–796, 1994) who proposed to generate larger networks where each node contributes to a smaller extent towards the global computation. In another exhaustive study, An studied (An, G., The effects of adding noise during backpropagation training on a generalization performance. *Neural Comput.*, 8, 643–674, 1996) the effects of noise addition on the generalization performance of an EBP-based network training. Thus, An's study separately analyzed the effects of noise in the inputs, weights, and the outputs, on network's prediction performance. The study revealed that noise in the outputs does not improve generalization, whereas noise in the inputs and weights is helpful. It was also observed that training of network using Langevin noise leads to the global minimization similar to that obtained using the simulated annealing approach. In a theoretical study, Bishop (Bishop, C. M., Training with noise is equivalent to Tikhonov regularization, *Neural Comput.*, 7, 108–116, 1995) claimed that the error term induced by the noise corresponds to a class of generalized regulariser. The regularisation (Poggio, T., Girosi, F. Regularization algorithms for learning that are equivalent to multilayer networks. *Science*, 247, 978, 1990) modifies the error function via the addition of a penalty term and controls the variance produced by the network. In essence, addition of noise in the training data provides a form of smoothing and the method works because the functions to be learned by the ANN are generally smooth, or at least piecewise continuous in finite number of regions. The statement embodies the underling assumption that for a well-posed problem, a unique solution exists and the small perturbations in the data should produce only small variations in the solution. In other words, for two similar inputs, two similar outputs are expected. Thus, for a given example data set, additional network training patterns can be generated by superimposing small amount of noise. The noise magnitude must be small since a large amount of noise will clearly distort the intrinsic relationship between the inputs and the outputs, while too small noise amount will lead to insignificant changes of no consequence. It immediately follows that it is necessary to exactly quantify the 'small' amount of noise to be superimposed on the input-output example data. It may be noted that in nonlinear systems, which exist abundantly in manufacturing and processing industries, the sensitivity with which changes in an input variable affect the output variable, may differ significantly. Consequently, it becomes necessary to add varying extents of noise to each input and output variable. Determining the exact amount of noise to be added to each input-output variable is a tricky issue and the present invention provides a genetic algorithm based effective solution to address this problem.

Genetic algorithms (Goldberg, D. E., *Genetic Algorithms in Search, Optimization, and Machine Learning*, Addison-Wesley: New York, 1989, Holland, J., *Adaptation in Natural and Artificial Systems*, University of Michigan Press, Ann Arbor, Mich., USA) are members of a class of function minimization/maximization formalisms, known as 'stochastic optimization algorithms'. They are based on the mechanisms of natural selection and genetics, which play a dominant role in the Darwinian evolution of biological organisms. The GAs are known to be efficient in searching noisy, discontinuous, multi-modal, and non-convex solution spaces and their characteristic features are: (i) they are 'zero'th order search techniques implying that GAs need only the scalar values and not the derivatives of the objective function to be optimized, (ii) GAs perform a global search and, hence, they mostly converge to the global optimum on the objective function surface, (iii) the search procedure used by the GAs is stochastic and, hence, they can be utilized without invoking ad-hoc assumptions, such as, smoothness, differentiability, and continuity, pertaining to the form of the objective function (owing to this feature, GAs can be used to solve optimization problems that cannot be solved using the classical gradient-based algorithms, which require the objective function to simultaneously satisfy the above-stated criteria), and (iv) the GA procedure can be effectively parallelized, which helps in efficiently and speedily searching a large multi-dimensional solution space. The present invention discloses a genetic algorithm based method for arriving at the optimal level of noise to be added to each input/output variable of the example set thereby creating an enlarged noise-superimposed sample dataset to be used in the ANN training such that the trained network possesses improved prediction accuracy and generalization performance.

In the GA procedure, the search for an optimal solution vector (also termed decision vector) representing the tolerance values of noise to be super-imposed on the input/output variables in the example set, begins from a randomly initialized population of probable (candidate) solutions. The solutions, usually coded in the form of binary strings (chromosomes), are then tested to measure their fitness in fulfilling the optimization objective i.e., function minimization or maximization. Subsequently, the candidate solutions are ranked in the decreasing order of their fitness scores and a main loop of GA operations comprising selection, crossover, and mutation, is performed on the ranked population. Implementation of the loop generates a new population of candidate solutions, which as compared to the current population usually fares better at fulfilling the optimization objective. The best string that evolves after repeating the above-described loop several times, forms the solution to the optimization problem. While evaluating the fitness of a solution vector, the input/output variable specific noise tolerance values contained therein are used to generate a large number of noise-superimposed sample input-output patterns, corresponding to each pattern in the example set; the resulting enlarged data set is then used for training the neural network with a view to minimize a least-squares cost function such as the RMSE. The training of ANN is performed using a gradient-based or other suitable weight-updation formalism. The RMSE magnitude obtained thereby is used to compute the fitness value of the candidate vector solution comprising noise tolerances. The network trained on the data generated using the GA-optimized noise tolerance values approximates better the true input-output relationship in presence of instrumental noise and/or measurement errors and, therefore, possesses good prediction accuracy and generalization performance.

The present invention is based on considering two examples viz. (i) ANN-based modeling of an industrial polymerisation reactor, and (ii) ANN-based modeling of continuous stirred tank reactor (CSTR) wherein an exothermic consecutive A→B→C reaction occurs. The prediction accuracies obtained using the invented method are compared with those obtained using a commonly used network training procedure.

OBJECTS OF THE INVENTION

The main object of the present invention is to provide a method for improving the prediction accuracy and generalization performance of an artificial neural network model in presence of input-output data containing instrumental noise and/or measurement errors. Specifically, a methodology has been invented to create, using computers, a Gaussian noise superimposed enlarged sample input-output data set to be used in the network training where the amount of noise to be added to each input/output variable is optimized using a genetic algorithm (GA) based strategy. The GA-based approach fixes the optimal level of noise to be added to the input-output variables of the example data by following the dictum that two similar inputs should result in two similar outputs.

SUMMARY OF THE INVENTION

The present invention employs artificially created noise superimposed input-output data patterns for building ANN models possessing improved prediction accuracy and generalization performance. In essence, the method presented in this invention forces an ANN to learn the noisy relationships existing between its inputs and outputs. The invented methodology uses input-output variable specific noise tolerance values for creating a noise-superimposed enlarged sample data set for network training. Specifically, the Gaussian noise of known tolerance is added to each input and output variable of the example set, and in this manner multiple noise-superimposed patterns are generated corresponding to each pattern in the example set. In the present invention, the tolerance values, which are specific to each input/output variable are optimized using a novel evolutionary stochastic optimization formalism, known as 'Genetic Algorithms'. The ANN models trained on the noise-superimposed enlarged sample data have been found to possess improved prediction accuracy and generalization capability.

DETAILED DESCRIPTION OF THE INVENTION

Accordingly, the present invention, provides a method for improving the prediction accuracy and generalization performance of nonlinear artificial neural network models when the input-output data, known as the example set, available for constructing the network model, comprises instrumental noise and/or measurement errors, said method comprising the steps of:

(a) generating noise-superimposed enlarged input-output sample data set using computer simulations;
(b) generating for each input-output pattern in the example set, M number of noise-superimposed sample input-output patterns (vectors) using computer simulations;
(c) generating noise-superimposed sample input-output patterns using noise tolerance values, which are specific to each input/output variable;
(d) generating Gaussian (normally) distributed random numbers using computer simulations to create noise-superimposed sample input-output patterns;
(e) determining the exact amount of Gaussian noise to be added to each input/output variable in the example set by using a stochastic search and optimization technique and
(f) using the computer generated noise-superimposed sample input-output patterns as the 'training set' for constructing the nonlinear artificial neural network model;

An embodiment of the present invention, wherein the exact amount of Gaussian noise to be added to each input output variable of the example set as determined by the genetic algorithms, is globally (and not locally) optimal.

Another embodiment of the present invention, wherein the example set is used as the 'test set' for monitoring the generalization performance of the artificial neural network model.

Yet another embodiment of the present invention, wherein the artificial neural network architecture is 'feed-forward', that is, the information flow within the network is unidirectional, from the input layer to the output layer.

Still another embodiment of the present invention, wherein the feed-forward neural network architecture includes the multilayer perceptron (MLP) networks, radial basis function networks (RBFN), and counterpropagation neural networks (CPNN).

Yet another embodiment of the present invention, wherein the algorithms used for constructing or training the artificial neural network model includes error-back-propagation, conjugate gradient, Quickprop and RPROP.

Still another embodiment of the present invention, wherein the stochastic search and optimization technique used to optimize the noise tolerances refers to genetic algorithms and related methods, namely, simulated annealing (SA), simultaneous perturbation stochastic approximation (SPSA), evolutionary algorithms (EA) and memetic algorithms (MA).

Yet another embodiment of the present invention, wherein an enlarged noise-superimposed sample input-output data set is created using computer simulations from the small-sized example input-output set.

Figure 1:
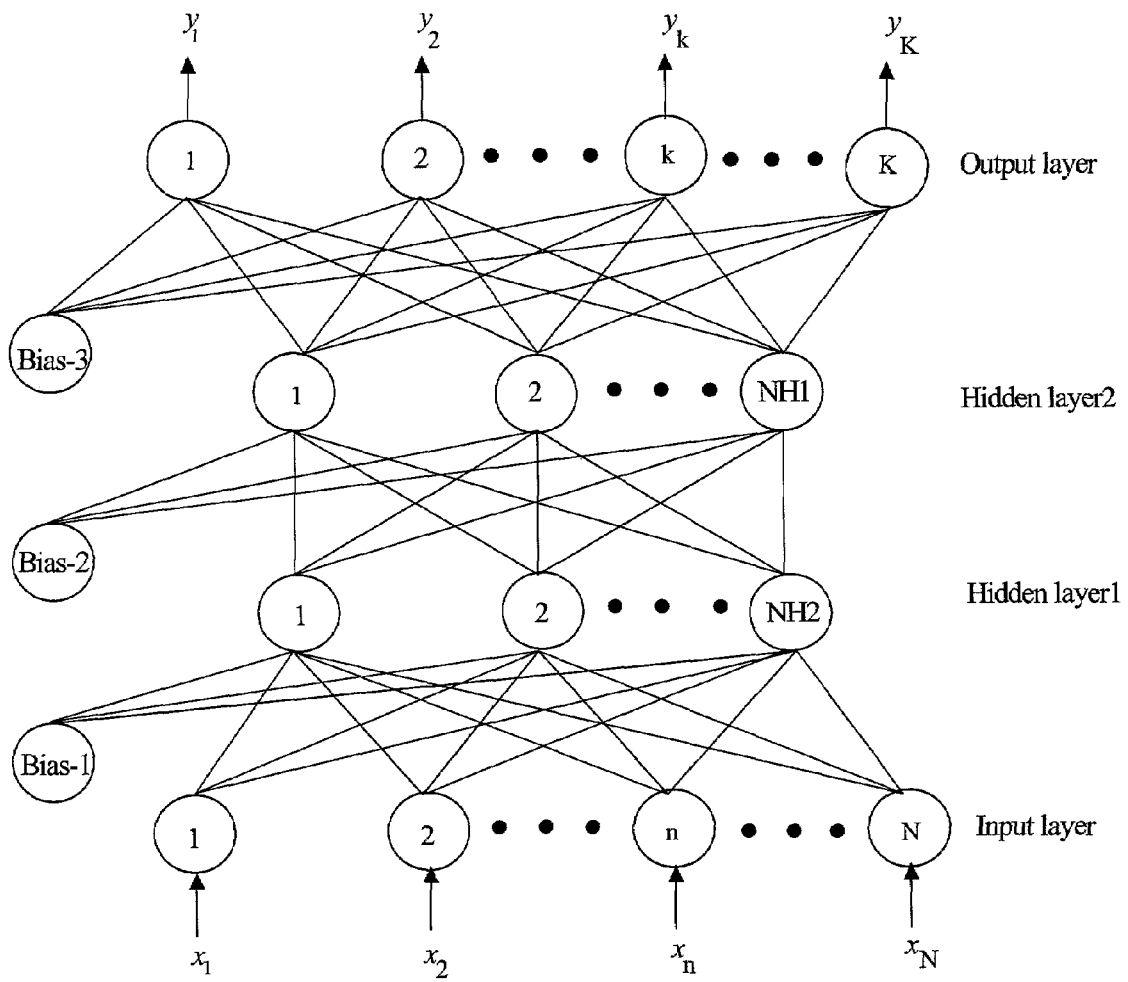
FIG. 1: represents a schematic of a typical Feed-forward neural network such as the Multilayer Perceptron (MLP).

The invention is further explained in the form of following embodiments. Consider, P number of input-output pattern pairs, $[(x_1, y_1), (x_2, y_2), \ldots, (x_p, y_p), \ldots, (x_P, y_P)]$, representing an example set. The inter-relationships between the N-dimensional input vector, $x_p$, and the corresponding K-dimensional output vector, $y_p$, is governed by a K-dimensional nonlinear function vector, $f$ defined as $y_p = f(x_p)$. The $x_p$ and $y_p$, vectors are also referred to as the input pattern and the corresponding output (target) pattern, respectively. The pth N-dimensional input vector, $x_p$, is defined as $[x_{p1},$ $x_{p2}, \ldots, x_{pN}]^T$ and the corresponding K-dimensional target output vector, $y_p$, as $[y_{p1}, y_{p2}, \ldots, y_{pK}]^T$. A feed-forward neural network (FFNN), such as the MLP (see FIG. 1), approximates the nonlinear relationship between $x_p$ and $y_p$ as given by $$y_p = f(x_p, W^H, W^O) \tag{1}$$

where, matrices $W^H$ and $W^O$, represent the weights on connections between MLP's input and hidden layer nodes and, hidden and output layer nodes, respectively. The overall objective of training an MLP network is to minimize a suitable least-squares error function, for example, the root-mean-squared error (RMSE) defined as (Nandi, S., Ghosh, S., Tambe, S. S., Kulkarni, B. D., Artificial neural-network-assisted stochastic process optimization strategies. *AIChE J.*, 47, 126, 2001):

$$RMSE = \sqrt{\frac{\sum_{i=1}^{N_{pat}} 2E_i}{N_{pat} \times K}} \tag{2}$$

where, i denotes index of the input pattern ($i=1, 2, \ldots, N_{pat}$); K refers to the number of output nodes, and $E_i$ represents the sum-squared-error (SSE) defined as $$E_i = \frac{1}{2}\sum_{k=1}^{K}(o_i^k - y_i^k)^2 \tag{3}$$

where, $y_i^k$ refers to the actual output of the kth output node when ith input pattern is applied to the network's input layer, and $o_i^k$ denotes the corresponding target output. The task of RMSE minimization is accomplished by using a suitable gradient-descent technique, such as the generalized delta rule (GDR) based error-back-propagation (EBP), conjugate gradient, or more advanced methodologies viz. Quickprop (Fahlman, S. E., Faster-learning variations on back-propagation: *Proceedings of the 1988 Connectionist Models Summer School*, D. S. Touretzky, G. E. Hinton, and T. J. Sejnowski, Eds., pp. 38–51, Morgan Kaufmann, San Mateo, Calif., 1988) and, Resilient Back-Propagation (RPROP) (Riedmiller, M., Braun H., A direct adaptive method for faster backpropagation learning: The RPROP algorithm. *Proc. of IEEE Int. Conf. On Neural Net*, San Fransisco, Calif., Mar. 28–Apr. 1, 1993). Network training is an iterative procedure that begins with initializing the weight matrices, $W^H$ and $W^O$, randomly. A training iteration consists of two types of passes, namely forward and reverse, through the network layers. In the forward pass, an input pattern from the training data set is applied to the input nodes and outputs of the hidden nodes are evaluated. For computing the stated output, first the weighted-sum of the inputs to a hidden node is calculated, which is then transformed using a nonlinear activation function, such as the logistic sigmoid. The outputs of the hidden nodes form inputs to the output-layer nodes, whose outputs are evaluated in a similar fashion to that of the hidden nodes. The output of the output-layer nodes, which is also referred to as the network output, is compared with the target output, and in the reverse pass, the difference between the network and target outputs (prediction error) is used for updating the weight matrices, $W^H$ and $W^O$. The weight-updation procedure when repeated for all the patterns in the training set completes one training iteration. It may be noted that the weight matrices $W^H$ and $W^O$ can be updated using various methods, such as, EBP, conjugate gradient, Quickprop and RPROP. The present invention proposes a methodology whereby a noise-superimposed enlarged sample input-output data set, to be used as the training data, is created from the example set and where the optimal amount of noise to be added to each input/output variable is determined using a genetic algorithm such that the resultant ANN model possesses improved prediction accuracy and generalization performance. The invented methodology to optimize the amount of noise to be added to each input/output variable of the example set is described below.

Consider the P number of N-dimensional input vectors in the example set as a [P×N] input matrix, X, and the equal number of corresponding K-dimensional output vectors as a [P×K] output matrix, Y. The present invention creates noise-superimposed matrix versions $\hat{X}$ and $\hat{Y}$, of matrices X and Y, respectively, which are used as the training input and output sets, for the ANN training. The amount of Gaussian (normally distributed) noise to be added is specific to an input/output variable, and characterized in terms of tolerance percentage. The noise tolerance vectors to be used for introducing noise in the input matrix, X, and the output matrix, Y, are defined as $\epsilon^I$ and $\epsilon^O$ respectively. The N-dimensional noise tolerance vector that characterizes the noise to be added to each element of the N-dimensional input vector is defined as:

$$\epsilon^I = [\epsilon_1^I, \epsilon_2^I, \ldots, \epsilon_n^I, \ldots, \epsilon_N^I]^T \tag{4}$$

and its nth element, $\epsilon_n^I$, is used to introduce Gaussian noise in the nth column elements $\{x_{pn}\}$; $p=1, 2, \ldots, P$, of the input matrix, X. The noise tolerance value, $\epsilon_n^I$, is defined as $$\epsilon_n^I = (3.09 \times 100) \times (\sigma_{pn}^I / x_{pn}); n=1, 2, \ldots, N \tag{5}$$

where, $X_{pn}$ and $\sigma_{pn}^I$ denote the mean and standard deviation of the Gaussian distribution. Rearranging Eq. 5, the standard deviation can be computed as $$\sigma_{pn}^I = (\epsilon_n^I \times x_{pn})/(3.09 \times 100) \tag{6}$$

Using $x_{pn}$ ($n=1, 2, \ldots, N$) as the mean, and $\sigma_{pn}^I$ ($n=1, 2, \ldots N$) as the standard deviation of the Gaussian distribution, M number of noise-superimposed sample input patterns are generated (using computer simulations) corresponding pth ($p=1, 2, \ldots, P$) input pattern in the example set. The resultant noise-superimposed induced input matrix ($\hat{X}$) has dimensions [(MP)×N].

Similar to the noise tolerance vector, $\epsilon^I$, for the inputs, we define the K-dimensional output noise tolerance vector, $\epsilon^O$, as $$\epsilon^O = [\epsilon_1^O, \epsilon_2^O, \ldots, \epsilon_k^O, \ldots, \epsilon_k^O]^T \tag{7}$$

The kth element, $\epsilon_k^O$, of this tolerance vector is used to introduce Gaussian noise in the kth column elements, $\{y_{pk}\}$, $p=1, 2, \ldots, P$, of the target output matrix, Y. The tolerance vector element, $\epsilon_k^O$, is defined as $$\epsilon_k^O = (3.09 \times 100) \times (\sigma_{pk}^O / y_{pk}) \tag{8}$$

where $y_{pk}$ and $\sigma_{pk}^O$ refer to the mean and standard deviation of the Gausian distribution, respectively. Rearranging Eq. 8, the standard deviation can be evaluated as $$\sigma_{pk}^O = (\epsilon_k^O \times y_{pk})/(3.09 \times 100) \tag{9}$$

The noise-superimposed sample output matrix, $\hat{Y}$, is generated in a similar manner to the matrix $\hat{X}$ using computer simulations; here, $y_{pk}$ (k=1, 2, ..., K) and $\sigma_{pk}^{o}$ (k=1, 2, ..., K) are used as the mean and standard deviation of the Gaussian distribution, respectively, and M number of noise-superimposed sample output patterns are formed corresponding to pth (p=1, 2, ..., P) target output pattern in the example set. The resultant noise-superimposed sample output matrix, $\hat{Y}$, has dimensions [(MP)×K]. During ANN training, matrices $\hat{X}$ and $\hat{Y}$ are used as the input-output training data, while matrices X and Y are used as the test input-output data to monitor the generalization performance of the network.

In a system where the relationship between its inputs and outputs is nonlinear, the dependent (output) variables exhibit varying extent of sensitivity to the changes in the casual (input) variables. Thus, determination of the exact amount of noise to be added to each input/output variable in the example set (as defined by the elements of tolerance vectors, $\epsilon^I$ and $\epsilon^O$) becomes a critical issue. The present invention introduces a GA-based methodology to optimize the exact amount of noise to be added to the input-output elements of the example data set. The noise-superimposed data when used in training the network results in a network model that possesses improved prediction accuracy and generalization performance. In what follows, the description of the GA-based approach for optimizing the exact amount of noise to be added to each input/output element of the example set, is provided.

The task of the GA-based optimization is described as: find the optimum values of the input/output variable specific noise tolerances such that the noise-superimposed enlarged training set created using the noise tolerance values results in a network model possessing improved prediction accuracy and generalization capability. In essence, the task of GA is to find the optimal input and output noise tolerance vectors, $\epsilon^{I*}=[\epsilon_1^{I*}, \epsilon_2^{I*}, \ldots, \epsilon_n^{I*}, \ldots, \epsilon_N^{I*}]^T$ and $\epsilon^{O*}=[\epsilon_1^{O*}, \epsilon_2^{O*}, \ldots, \epsilon_2^{O*}, \ldots, \epsilon_k^{O*}]^T$, such that when they are used for generating the noise-superimposed enlarged input-output training data set, the RMSE error with respect to the test set is minimized. Accordingly, the objective function to be minimized by the GA is the test set RMSE, defined as:

$$RMSE_{tst} = \sqrt{\frac{\sum_{i=1}^{N_{tst}} 2E_i}{N_{tst} \times K}} \quad (10)$$

where, i denotes the index of the test input pattern (i=1, 2, ..., $N_{tst}$); K refers to the number of output nodes in the MLP architecture, $N_{tst}$ represents the number of patterns in the test set, and $E_i$ represents the sum-squared-error (SSE) corresponding to the ith test pattern. The genetic algorithm steps involved in the $RMSE_{tst}$ minimization are:

(1) Initialization of candidate solution population: Set the generation index ($N_{gen}$) to zero and generate a population of $N_{pop}$ binary strings (chromosomes) randomly; each string possessing a total of $l_{chr}$ bits is divided into as many segments as the number of decision variables (N+K) to be optimized. Note that the decimal equivalents of the (N+K) binary segments of a string represent a candidate solution vector whose first N elements describe the noise tolerances corresponding to N input variables, and the next K elements represent noise tolerances corresponding to as many output variables. Thus, the population of $N_{pop}$ candidate solutions can be described as a combined set of input-output noise tolerances:

$$\{\epsilon_{ln}^{O}, \epsilon_{lk}^{O}\}; l=1,2,\ldots,N_{pop}; n=1,2,\ldots,N; k=1,2,\ldots,K \quad (11)$$

(2) Fitness computation: Utilize lth (l=1, 2, ..., $N_{pop}$) candidate solution in the current population comprising a vector-pair of input-output noise tolerances, to compute the fitness value of that solution. Specifically, the input-output noise tolerance values are used to create the Gaussian noise superimposed enlarged training set $\{\hat{X},\hat{Y}\}$ by following the procedure outlined earlier (also see Eqs. 6 and 9). The training set so created is utilized for adjusting the network weight matrices $W^H$ and $W^O$ in the framework of a suitable learning algorithm such as the EBP, conjugate gradient, Quickprop and RPROP. During training, the example input-output set is used as the test set, and the corresponding RMSE value ($RMSE_{tst}$ (l)) is used to compute the fitness ($\xi_l$) of lth candidate solution using, $$\xi_l = 1/(1+RMSE_{tst}(l)); l=1,2,\ldots,N_{pop} \quad (12)$$

Note that the form of the fitness function defined in Eq. 12 is one of the several that can be used for evaluating the fitness value, $\xi_l$. It is also possible to use fitness functions involving penalty terms (Deb, K., *Optimization for Engineering Design, Algorithms and Examples*, Prentice-Hall, New Delhi, 1995). Following fitness evaluation, the candidate strings are ranked in the decreasing order of their fitness values.

(3) Selection of parents: Choose $N_{pop}$ number of parent chromosomes from the current population to form the mating pool. Members of this pool are so chosen as to possess relatively high fitness scores and they are used to produce offspring strings. The commonly used parent selection techniques are the Roulette-Wheel (RW) method, and the more stable variant of the RW method, known as stochastic remainder selection (SRS) (Goldberg, D. E. *Genetic Algorithms in Search, Optimization, and Machine Learning*, Addison-Wesley: New York, 1989).

(4) Crossover: From the mating pool, randomly select $N_{pop}/2$ number of parent pairs and perform crossover operation on each pair with crossover probability equal to $P_{cr}$ (0<$P_c\le1.0$). In crossover, each member of a parent pair is cut at the same randomly chosen crossover point. As a result, two substrings are formed from each parent string; the substrings are mutually exchanged between parents and combined to obtain two offspring chromosomes. This crossover operation termed 'single point crossover' when performed on all the parent-pairs results in a population comprising $N_{pop}$ offspring strings.

(5) Mutation: Perform mutation (bit-flipping) operation on the offspring strings where probability of a bit getting flipped (zero to one or vice versa) is equal to $p_{mut}$; the recommended range of $p_{mut}$ is [0.01–0.05].

(6) Increment the generation index by one ($N_{gen}=N_{gen}+1$) and repeat steps 2–5 on the newly generated offspring strings until convergence is achieved. The criterion for the GA-convergence could be: $N_{gen}$ exceeds its maximum limit ($N_{gen}^{max}$), or the fitness score of the best string in the mutated offspring population undergoes a very small or no change over successive generations. After GA-convergence is achieved, the string possessing highest fitness value is decoded to obtain the optimized solution. Usually a large number of generations are necessary to obtain the optimal solution vectors, $[\epsilon^{I*}, \epsilon^{O*}]$, which lead to the least $RMSE_{tst}$ magnitude.

While preferred embodiments of the invention are described below, the present invention is capable of undergoing variations and modifications. Thus, the scope of the present invention is not limited to the precise details of the Examples used to demonstrate its effectiveness.

In an embodiment of the present invention, the artificial neural networks used to perform nonlinear modeling and classification, are trained using the noise-superimposed enlarged input-output data set, where the optimal amount of noise to be added to each input/output variable in the example set, has been determined using a stochastic optimization formalism known as genetic algorithms, which enable the networks to possess improved prediction accuracy and generalization performance.

In another embodiment of the present invention, the method is shown to be applicable when the input-output data termed 'example set' containing instrumental noise and/or measurement errors, has been collected either offline or online.

In yet another embodiment of the present invention, the methodology does not require, for its implementation, the knowledge of process monitoring system, the type of process and sensor hardware, etc.

In still another embodiment of the present invention, the optimal noise to be added to the example data can be determined using other stochastic optimization techniques, such as simultaneous perturbation stochastic approximation (SPSA), simulated annealing (SA), ant colony methods, and memetic algorithms.

In an additional embodiment of the present invention, the methodology can be used to develop artificial neural network models in situations where relationships between the input and the output example data are nonlinear.

In yet additional embodiment of the present invention, the invented formalism is applicable to various deterministic and stochastic artificial neural network training schemes, such as error-back-propagation, conjugate gradient, Quick-prop and RPROP.

Figure 2:
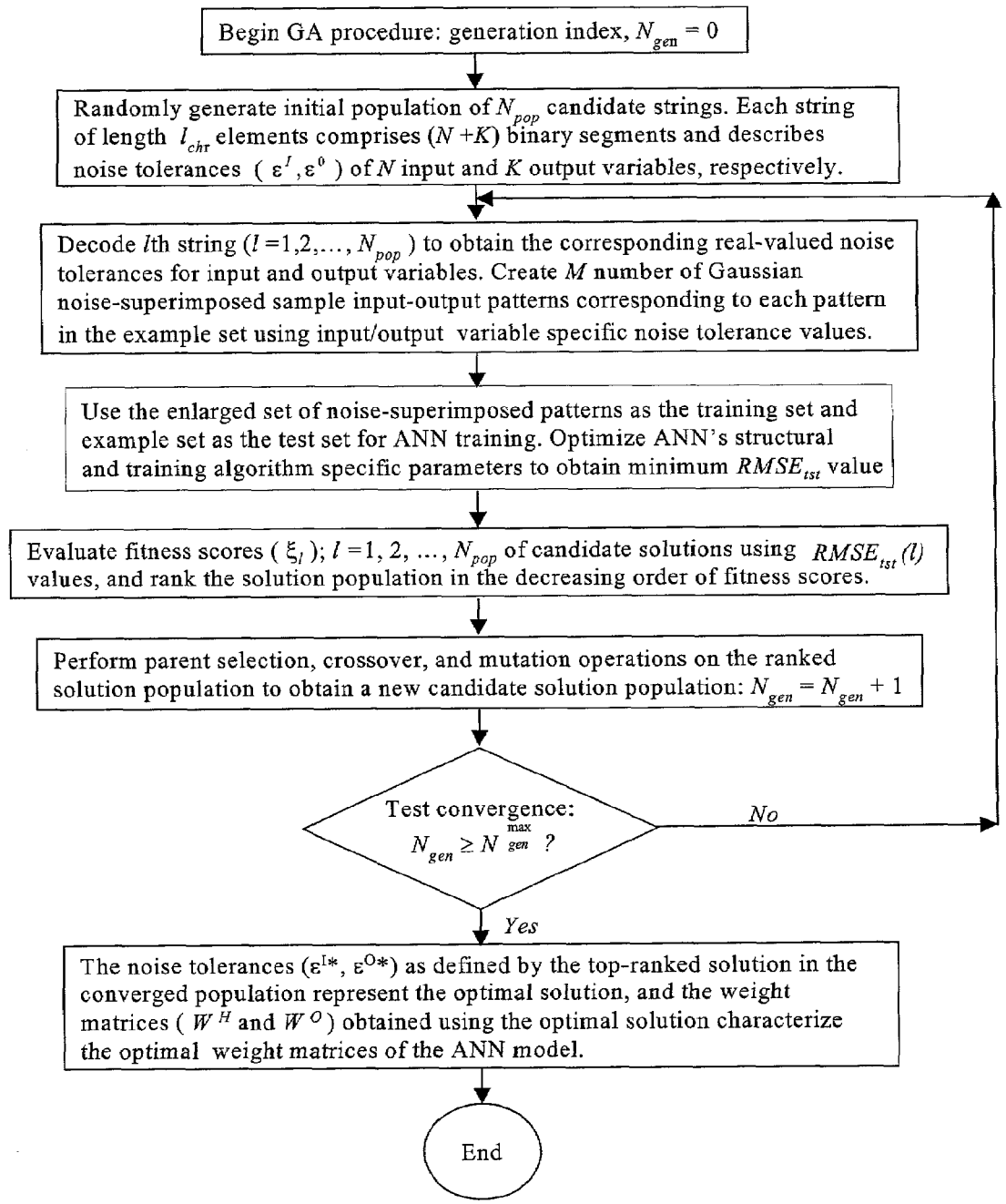
FIG. 2: represents the flow-chart detailing steps in the invention.

Accordingly, the present invention provides a method for improving prediction accuracy and generalization performance of artificial neural network model in presence of data containing instrumental noise and/or measurement errors, which comprises the steps (see FIG. 2):

(a) Compile process data (example set) in the form of a [P×N] matrix (X) of casual (input) variables, and the corresponding [P×K] matrix (Y) of dependent (output) variables.

(b) Preprocess the example data set, that is, remove the obvious and non-obvious outliers, and discard patterns containing missing data, faulty sensor readings, etc.

(c) Begin the GA search and optimization procedure (number of generation, $N_{gen}=0$) by randomly generating a candidate solution population of size $N_{pop}$ strings where each solution is an [N+K] dimensional decision variable vector describing N input noise tolerances ($\epsilon^I$), and K output noise tolerances ($\epsilon^O$).

(d) Using lth (l=1, 2, ..., $N_{pop}$) candidate solution perform following steps:

(i) Corresponding to the pth (p=1, 2, ..., P) input-output pattern in the example set, generate M number of Gaussian noise superimposed sample input-output patterns using computer simulation. The standard deviation values ($\sigma^I$, $\sigma^O$) for generating the input and output sample patterns are computed using Eqs. 6 and 9, respectively. The resultant sample input matrix, $\hat{X}$, and the output matrix, $\hat{Y}$, are of dimensions [(MP), N] and [(MP), K], respectively.

(ii) Train a feed-forward ANN, such as the MLP, housing N number of input nodes, $N_H$ number of hidden nodes, a bias node each in the input and hidden layers, and K number of output nodes, using a suitable training algorithm, for instance, error-back-propagation, conjugate gradient, Quick-prop or RPROP. During training, the network weight matrices, $W^H$ and $W^O$ are adjusted using the noise-superimposed sample input-output matrices, $\hat{X}$ and $\hat{Y}$, respectively, and the example input-output matrices X and Y are used as the test data to gauge the generalization ability of the network. The objective of network training is to minimize the RMSE with respect to the test set ($RMSE_{tst}$). To achieve this objective, it is necessary to optimize the number of hidden layers, the number of nodes in each hidden layer, and training algorithm specific parameters, for example, the learning rate and momentum coefficient in the EBP algorithm. The minimized test set RMSE value corresponding to lth candidate solution is defined as $RMSE_{tst}(l)$.

(e) Compute fitness values, $\xi_l$; l=1, 2, ..., $N_{pop}$ of candidate solutions using the minimized $RMSE_{tst}(l)$ values obtained in the previous step. An appropriate fitness function such as the one given below may be used for computing the fitness values:

$$\xi_l = 1/(1 + RMSE_{tst}(l)); \; l=1, 2, \ldots, N_{pop} \quad (13)$$

where, $\xi_l$ refers to the fitness score of the lth candidate solution and $RMSE_{tst}(l)$ denotes the minimized test set RMSE value when lth solution is used to generate the noise-superimposed enlarged training data. After evaluating their fitness values, the candidate solutions are ranked in the decreasing order of fitness scores.

(f) Perform selection, crossover and mutation operations, as detailed earlier, on the current ranked population of candidate solutions to obtain a new generation of solutions ($N_{gen}=N_{gen}+1$).

(g) Perform steps (d) to (f) on the new generation of candidate solutions till convergence is achieved. The criterion for successful convergence is either the GA has evolved over a large number of generations ($N_{gen} > N_{gen}^{max}$) or the fitness value of the best solution exhibits negligible or no change in successive generations. The candidate solution possessing the highest fitness value in the converged population represents the GA-optimized solution ($\xi^{I*}, \xi^{O*}$) and the weight matrices ($W^H$ and $W^O$) corresponding to this solution represent the optimal weights of an ANN model possessing improved prediction accuracy and generalization performance.

The following examples making use of the present invention are given by way of illustration and therefore should not be construed to limit the scope of the present invention.

EXAMPLE 1

Data used in the first illustration of the invented methodology, is taken from a running industrial polymerization process. The process data consist of nine inputs and one output; inputs describe process conditions and the output represents a polymer quality parameter. A total of 28 input-output data patterns (example set) were available for ANN modeling. These data contained instrumental noise and measurement errors. Using MLP as the ANN paradigm, first several network models were developed to predict the polymer quality parameter using various training algorithms, such as the EBP, conjugate gradient, Quickprop and RPROP. While developing the MLP-based models, the effects of various network structural parameters, such as the number of hidden layers, the number of nodes in each hidden layer, learning rate, momentum coefficient, etc., were rigorously studied. Also, the effects of different initializations of the network weights, and the size of the training and test sets, were exhaustively examined. The architecture of the MLP network trained using the above-stated methods that yielded the smallest RMSE values with respect to the training and test sets, contained nine nodes in the input layer, six nodes in hidden layer-1, seven nodes in hidden layer-2, and one node in the output layer. The magnitudes of the RMSE errors with respect to the training and test sets were 0.00590 ($RMSE_{trn}$) and 0.03436 ($RMSE_{tst}$), respectively. As can be seen from the RMSE values that the $RMSE_{tst}$ is much larger than the $RMSE_{trn}$, and thus it can be inferred that the generalization ability of the network model is not satisfactory. To bring improvements in both the prediction accuracy and the generalization performance of the network model, the methodology illustrated in the present invention was used. Specifically, 25 (M=25) noise-superimposed sample input-output patterns were generated for each pattern in the example set. The optimal input-output noise tolerance values ($\xi^{I*}, \xi^{O*}$) used for generating the noise-superimposed data comprising a total of 700 input-output patterns, were obtained using the genetic algorithm based strategy introduced in the present invention(also see FIG. 2). The optimal tolerance values given by the GA are listed in Table 1. These values were obtained using following GA-specific parameter values: (i) length of each population string ($l_{chr}$)=10 bits, (ii) population size ($N_{pop}$)=16, (iii) probability of crossover ($P_{cr}$)=0.9 and, (iv) mutation probability ($P_{mut}$)= 0.05. The MLP network trained on the noise-superimposed data resulted in the RMSE values reported in Table 2; for comparison purposes the smallest RMSE values as obtained using the non noise-superimposed data as the training set are also listed in the Table. It can be clearly seen from the values listed in Table 2 that the network trained on the noise-superimposed data has resulted in smaller RMSE values for both the training and test data. More importantly, the $RMSE_{tst}$ has reduced significantly from 0.03436 to 0.00172. For facilitating comparison, the average percentage error and correlation coefficient (CC) between the network predicted and the target output values, have been computed and they are also listed in Table 2. As can be observed, the CC values have increased when noise-superimposed data are used for network training. The smaller training and test set RMSE values respectively indicate improved prediction accuracy and generalization performance of the network model trained on the noise-superimposed data. Also, the average percentage error between the network predicted outputs and their desired magnitudes has reduced significantly. It can thus be inferred that the present invention has been successful in improving the prediction accuracy and also the generalization performance of the network model.

TABLE 1

Optimum noise tolerance values for the input-output variables as obtained using the GA-based strategy for industrial polymerization process.

| Percent noise tolerances ($\epsilon^{I*}$) for input variables | | | | | | | | | Percent noise tolerance, ($\epsilon^{O*}$), for output variable |
|---|---|---|---|---|---|---|---|---|---|
| $\epsilon_1^{I*}$ | $\epsilon_2^{I*}$ | $\epsilon_3^{I*}$ | $\epsilon_4^{I*}$ | $\epsilon_5^{I*}$ | $\epsilon_6^{I*}$ | $\epsilon_7^{I*}$ | $\epsilon_8^{I*}$ | $\epsilon_9^{I*}$ | $\epsilon_1^{O*}$ |
| 0.569 | 0.246 | 0.932 | 0.540 | 0.604 | 0.810 | 0.896 | 0.662 | 0.613 | 0.831 |

TABLE 2

Comparison of RMSE values, correlation coefficients and average prediction errors obtained using non-noise-superimposed and noise-superimposed training data sets.

| Training and test data description | RMSE values for training and test sets | | Correlation coefficient (CC) | | Average absolute prediction error (%) | |
|---|---|---|---|---|---|---|
| | $RMSE_{trn}$ | $RMSE_{tst}$ | Training set | Test set | Training set. | Test set |
| 1. Example set partitioned into training and test sets (no noise-superimposition) | 0.00590 | 0.03436 | 0.99976 | 0.99529 | 1.4113 | 4.9748 |
| 2. Noise-superimposed training data and example set as the test data, where optimal amount of noise to be added to input/output variables is determined by GAs. | 0.00341 | 0.00172 | 0.9999 | 0.9998 | 0.8238 | 1.2745 |

EXAMPLE 2

In this example, a process involving jacketed non-isothermal continuous stirred tank reactor (CSTR) wherein two first order reactions in series, A→B→C, take place, is considered. The process data comprises steady-state values of six CSTR operating variables (inputs) and the single output therein describes the corresponding steady-state value of a product quality variable. A total of 50 input-output data patterns (example set) were available for the ANN-based modeling; the data contained instrumental noise and/or measurement errors. An MLP model was first developed by employing the example set as the training data for predicting the value of the output variable, for which various training algorithms, such as the EBP, conjugate gradient, Quickprop and RPROP, were utilized. While developing the MLP network models, the effects of various structural parameters, for example, the number of hidden layers, the number of nodes in each hidden layer, learning rate, momentum coefficient, etc., were studied. Also, the effects of different initializations of the network weights, and the size of the training and test sets, were examined rigorously. The architecture of the MLP network trained using the above-stated methods, and that yielded the smallest RMSE error with respect to the training and test sets, contained six nodes in the input layer, four nodes in hidden layer-1, four nodes in hidden layer-2, and one node in the output layer. The RMSE errors with respect to the training and test sets were found to be 0.00909 ($RMSE_{trn}$) and 0.01405 ($RMSE_{tst}$), respectively. From the RMSE values it is seen that there still exists considerable scope to improve network model's prediction accuracy and generalization performance. Towards this objective, the methodology illustrated in the present invention was used. Specifically, 25 (M=25) noise-superimposed sample input-output patterns were generated for each pattern in the example set. The optimal tolerance values ($\epsilon^{I*}, \epsilon^{O*}$) used for generating the noise-superimposed data comprising a total of 1250 sample input-output patterns were obtained using the genetic algorithm based strategy introduced in the present invention (see FIG. 2). The optimal noise tolerance values given by the GA are listed in Table 3. These values were obtained using following GA-specific parameter values: (i) length of each population string ($l_{chr}$)=10 bits, (ii) candidate population size ($N_{pop}$)=14, (iii) probability of crossover ($P_{cr}$) 0.9, and (iv) mutation probability ($P_{mut}$)= 0.05. The smallest training and test set RMSE values obtained using the noise-superimposed data are listed in Table 4; for comparison purposes the smallest RMSE values as obtained using the data devoid of noise-superimposition, are also listed in the Table. It is clearly observed from the values listed in Table 4 that the network trained on the noise-superimposed data has resulted in lower RMSE values for both the training and test data. More importantly, the $RMSE_{tst}$ has reduced significantly from 0.01405 to 0.00183. The very small training and test set RMSE values are indicative of enhanced prediction accuracy and generalization performance of the network model trained on the noise-superimposed data. This inference is also supported by the corresponding higher ($\approx 1$) correlation coefficient values and smaller average prediction error (%) values. It can thus be concluded that the present invention has been successful in improving the prediction accuracy and also the generalization performance of the ANN model for the CSTR.

TABLE 3

Optimum noise tolerance values for the input-output variables as obtained using the GA-based strategy for the CSTR process

| Percent noise tolerances ($\epsilon^{I*}$) for input variables | | | | | | Percent noise tolerance, ($\epsilon^{O*}$), for output variable |
|---|---|---|---|---|---|---|
| $\epsilon_1^{I*}$ | $\epsilon_2^{I*}$ | $\epsilon_3^{I*}$ | $\epsilon_4^{I*}$ | $\epsilon_5^{I*}$ | $\epsilon_6^{I*}$ | $\epsilon_1^{O*}$ |
| 0.753 | 1.206 | 0.227 | 1.413 | 0.913 | 0.416 | 1.533 |

TABLE 4

Comparison of RMSE values, correlation coefficients, and average prediction errors obtained using non noise-superimposed and noise-superimposed training data sets for CSTR process

| Training and test data description | RMSE values for training and test sets | | Correlation coefficient (CC) | | Average absolute prediction error (%) | |
|---|---|---|---|---|---|---|
| | $RMSE_{trn}$ | $RMSE_{tst}$ | Training set | Test set | Training set | Test set |
| 1. Example set partitioned into training and test sets (no noise-superimposition) | 0.00909 | 0.01405 | 0.99904 | 0.99872 | 1.1038 | 1.041 |
| 2. Noise-superimposed training data and example set as the test data, where optimal amount of noise to be added to input/output variables is determined by GAs. | 0.00793 | 0.00183 | 0.99931 | 0.99902 | 1.0038 | 0.9801 |

ADVANTAGES:
(1) An easy to implement formalism to construct nonlinear artificial neural network models in presence of data comprising instrumental noise and/or measurement errors.
(2) The methodology is cost-effective since it generates an enlarged training data set exclusively by computer simulations, and thereby avoids collection of additional process data for improving the prediction accuracy and generalization ability of artificial neural network models.

(3) The invented methodology generates noise-superimposed training data for improving prediction accuracy and generalization performance of an artificial neural network model where the amount of noise to be added to each input-output variable is not selected arbitrarily, but using a novel and powerful stochastic optimization technique, namely, genetic algorithms.

(4) The usage of genetic algorithms allows to obtain the globally (and not locally) optimal amount of noise to be added to each input/output variable of the example data.

(5) The invented methodology works even when the example data are inadequate to conduct the ANN training, since it creates additional training data using noise-superimposition technique.

(6) The methodology is sufficiently general to warrant its application for modeling and classification of multiple input-multiple output nonlinear systems.

(7) The invented methodology can be used in real-time applications involving artificial neural network based modeling and classification.

(9) Invented formalism can be effectively parallelized for implementation using parallel computers.

(10) Implementation of the present invention is fully automatic requiring minimal or no user intervention.

The invention claimed is:

1. A computer-implemented method for improving the prediction accuracy and generalization performance of nonlinear artificial neural network models when an example set of input-output data, available for constructing the network model, comprises at least one of instrumental noise and measurement errors, said method comprising the steps of:
   (a) generating noise-superimposed enlarged input-output sample data set using computer simulations;
   (b) generating for each input-output pattern in the example set, M number of noise-superimposed sample input-output patterns using computer simulations;
   (c) generating noise-superimposed sample input-output patterns using noise tolerance values, which are specific to each input-output variable;
   (d) generating Gaussian distributed random numbers using computer simulations to create noise-superimposed sample input-output patterns;
   (e) determining an exact amount of Gaussian noise to be added to each input-output variable in the example set by using a stochastic search and optimization technique; and
   (f) constructing the nonlinear artificial neural network model using a training set, the training set comprising the computer generated noise-superimposed sample input-output patterns, wherein the nonlinear artificial neural network models comprise a model of an industrial polymerization process or a jacketed non-isothermal continuous stirred tank reactor, wherein input-output variables represent at least two of a temperature, a pressure level, a liquid, and a gas, and wherein at least one input variable effects at least one output variable differently from another input variable, and wherein the exact amount of Gaussian noise for each of input variables is determined using the stochastic search and optimization technique based on effect of a respective input variable on said at least one output variable.

2. The method according to claim 1, wherein the exact amount of Gaussian noise to be added to each input output variable of the example set as determined by the genetic algorithms, is globally and not locally optimal.

3. The method according to claim 1, wherein generalization performance of the artificial neural network model is monitored using the example set as a test set.

4. The method according to claim 1, wherein the artificial neural network architecture is feed-forward and wherein, in the feed forward artificial neural network architecture, information flow within the network is unidirectional, from input layer to output layer.

5. The method according to claim 1, wherein the neural network architecture is a feed-forward, and wherein the feed-forward neural network architecture comprises at least one of multilayer perceptron (MLP) networks, radial basis function networks (RBFN), and counter propagation neural networks (CPNN).

6. The method according to claim 1, wherein the algorithms used for constructing or training the artificial neural network model includes error-back-propagation, conjugate gradient, Quickprop and RPROP.

7. The method according to claim 1, wherein the stochastic search and optimization technique used to optimize the noise tolerances refers to genetic algorithms and related methods, namely, simulated annealing (SA), simultaneous perturbation stochastic approximation (SPSA), evolutionary algorithms (LA) and memetic algorithms (MA).

8. The method according to claim 1, wherein an enlarged noise-superimposed sample input-output data set is created using computer simulations from the small-sized example input-output set.

* * * * *